United States Patent [19]

Martinez-Vera et al.

[11] Patent Number: 4,498,498
[45] Date of Patent: Feb. 12, 1985

[54] DOUBLE VALVE ASSEMBLY

[75] Inventors: Enrique Martinez-Vera; Gilberto Guerra-Garcia, both of Monterrey; Jose L. L. Tovalin, San Nicolas de Los Garza, all of Mexico

[73] Assignee: Hylsa, S.A., Monterrey, Mexico

[21] Appl. No.: 315,250

[22] Filed: Oct. 26, 1981

[51] Int. Cl.³ .............................................. F16K 3/36
[52] U.S. Cl. ............................. 137/613; 137/246.22; 137/587; 251/300; 75/34
[58] Field of Search .................. 137/613, 246.22, 587; 251/300, 305, 313; 75/34

[56] References Cited

U.S. PATENT DOCUMENTS

| | | | |
|---|---|---|---|
| 1,174,729 | 3/1916 | Jones | 75/34 |
| 1,517,786 | 12/1924 | Kus | 251/300 |
| 3,710,808 | 1/1973 | Celada et al. | 137/587 |
| 3,799,367 | 3/1974 | Grewer et al. | 75/34 |

*Primary Examiner*—A. Michael Chambers
*Attorney, Agent, or Firm*—Curtis, Morris & Safford

[57] ABSTRACT

A double valve assembly for regulating the feed of particulate material to or from a pressure vessel comprises a valve casing containing a flow-regulating valve and pressure sealing valve in series. Particulate material is fed to the valve assembly through a feed tube located at the top of the casing. The flow-regulating valve comprises a dish-shaped valve member swingable from a first position wherein it confronts the bottom of the feed tube and blocks flow of material therethrough to a second position at one side of the feed tube. The bottom of the feed tube is constructed and arranged to guide the particulate material away from the second valve position and thereby facilitate swinging movement of the swingable member from its first to its second position.

6 Claims, 3 Drawing Figures

DOUBLE VALVE ASSEMBLY

This invention relates to the feeding of particulate material to, and removal of particulate material from, a pressurized vessel. The invention may be advantageously used, for example, in the direct gaseous reduction of iron ore to sponge iron in a vertical moving bed reactor of the type in which particulate iron ore is gravity fed to the top of the reactor and flows downwardly therein counter-current to an upwardly flowing hot reducing gas at an elevated pressure. The feed of particulate ore to such a reactor and the removal of sponge iron from the bottom of the reactor present something of a problem in that if commonly available types of valves are used, the flow of particulate material through the valve tends to erode the valve seat to the point that when the valve is closed it no longer provides a gas-tight seal.

One previously proposed solution to this problem is disclosed in U.S. Pat. No. 3,710,808. In accordance with the disclosure of this patent, a double valve assembly is used comprising a vertical casing containing a flow-regulating valve in the upper part of the casing and a pressure sealing valve in the lower part of the casing. Particulate material enters the top of the casing through a downwardly extending feed tube. The upper or flow-regulating valve is swingable from a first or "closed" position in which it confronts the bottom of the feed tube and blocks the flow of particulate solids therefrom, to a second or "open" position at one side of the feed tube. When the swingable valve is in its "open" position, it permits free flow of particulate material through the feed tube. In the lower part of the casing there is a plug or cock type of valve having a horizontally arranged cylindrical rotatable valve member which, when properly lubricated, provides a good gas-tight seal. By opening the pressure-sealing valve before the flow regulating valve is opened and by closing the flow regulating valve before the pressure sealing valve is closed, the sealing surfaces of the sealing valve can be protected from the erosive effects of the flow of particulate solids.

One problem that has been encountered in using double valve structures of the type disclosed in U.S. Pat. No. 3,710,808 arises out of the fact that when the swingable valve member of the flow-regulating valve is in its first or "closed" position, particulate solids tend to accumulate on the upper surface thereof to such an extent as to impede the movement of the valve member to its second or "open" position at one side of the feed tube. The present invention is particularly addressed to this problem.

It is accordingly an object of the present invention to provide an improved valve structure for regulating the flow of particulate material to and from a pressurized vessel. It is another object of the invention to provide an improved double valve assembly for regulating the gravity feed of particulate iron ore to a moving bed, pressurized reduction reactor. It is a more specific object of the invention to improve the operation of the flow-regulating valve of such a double valve assembly. Other objects of the invention will be in part obvious and in part pointed out hereafter.

The objects and advantages of the present invention can best be understood and appreciated by reference to the accompanying drawings which illustrate valve structures incorporating several embodiments of the invention and wherein.

Figure 2:
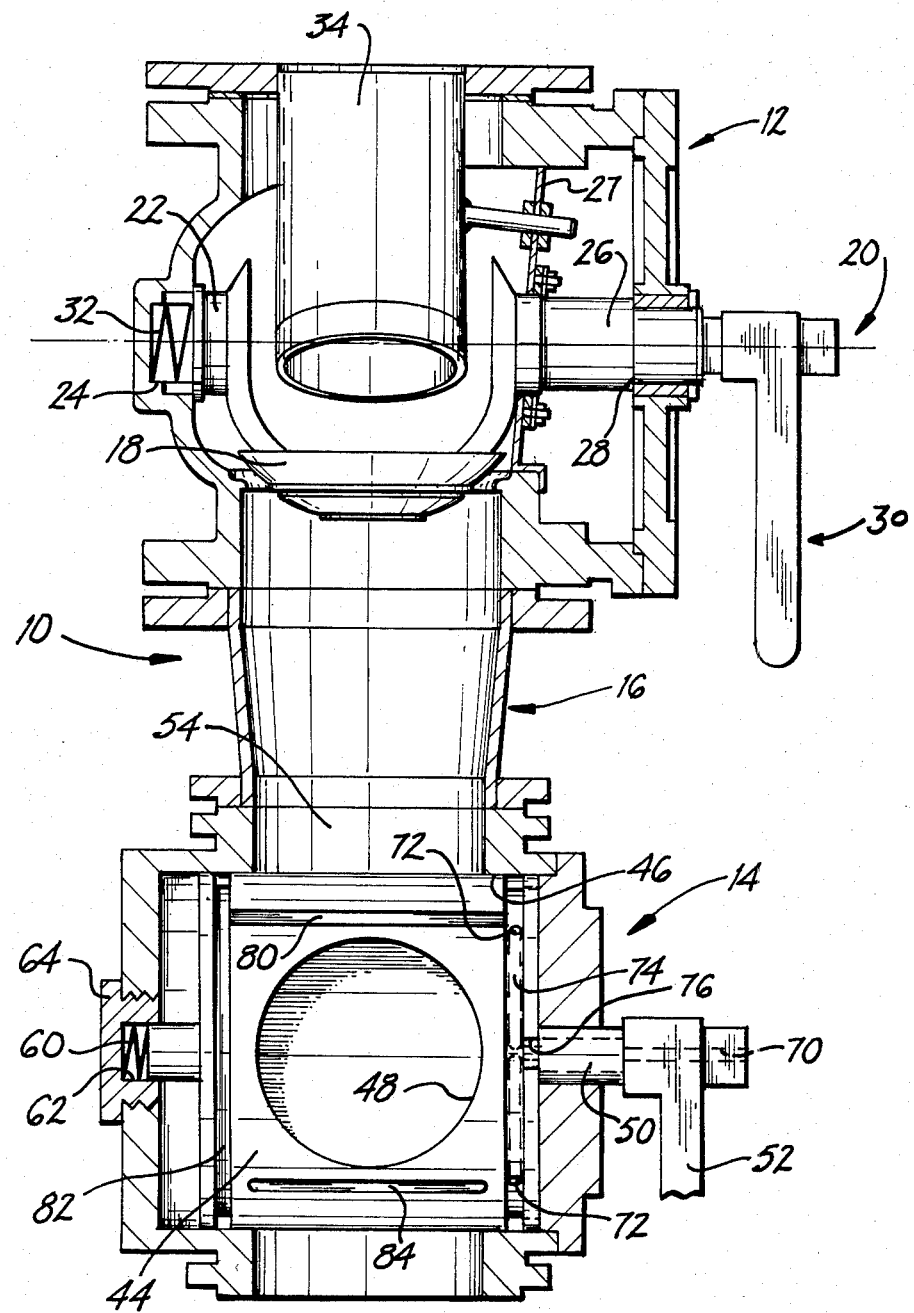
FIG. 2 is a vertical section taken at right angles with respect to the section of FIG. 1 and with the feed tube again shown in section.

Referring to the drawings, the valve assembly there shown comprises a casing or housing generally indicated by the numeral 10 and including an upper housing 12, lower housing 14 and interconnecting frusto-conical section 16. Mounted within the upper portion 12 of the casing 10 there is a dish-shaped valve member 18 supported for swinging movement about an axis 20 (see FIG. 2). The upper left end of valve member 18 is supported by a journal member 22 secured to the valve member and extending into a recess 24 in the inner wall of the upper section 12 of the valve casing to form a journal bearing. The upper right-hand end of valve member 18 has secured thereto a journal member 26 that extends through a hole 28 in the wall of the casing and has secured thereto at its outer end a lever 30 by means of which the valve member 18 can be rotated. Within the recess 24 there is a spring 32 that is biased to maintain the valve member 18 centrally located within the upper section of the casing. As shown in FIG. 2 a sealing means 27 is provided to contain the ore fed to the valve assembly so as to prevent any ore from impinging on the journal member 26 and rotating assembly. The sealing means 27 is connected to the upper housing 12 as illustrated in FIG. 2.

Figure 1:
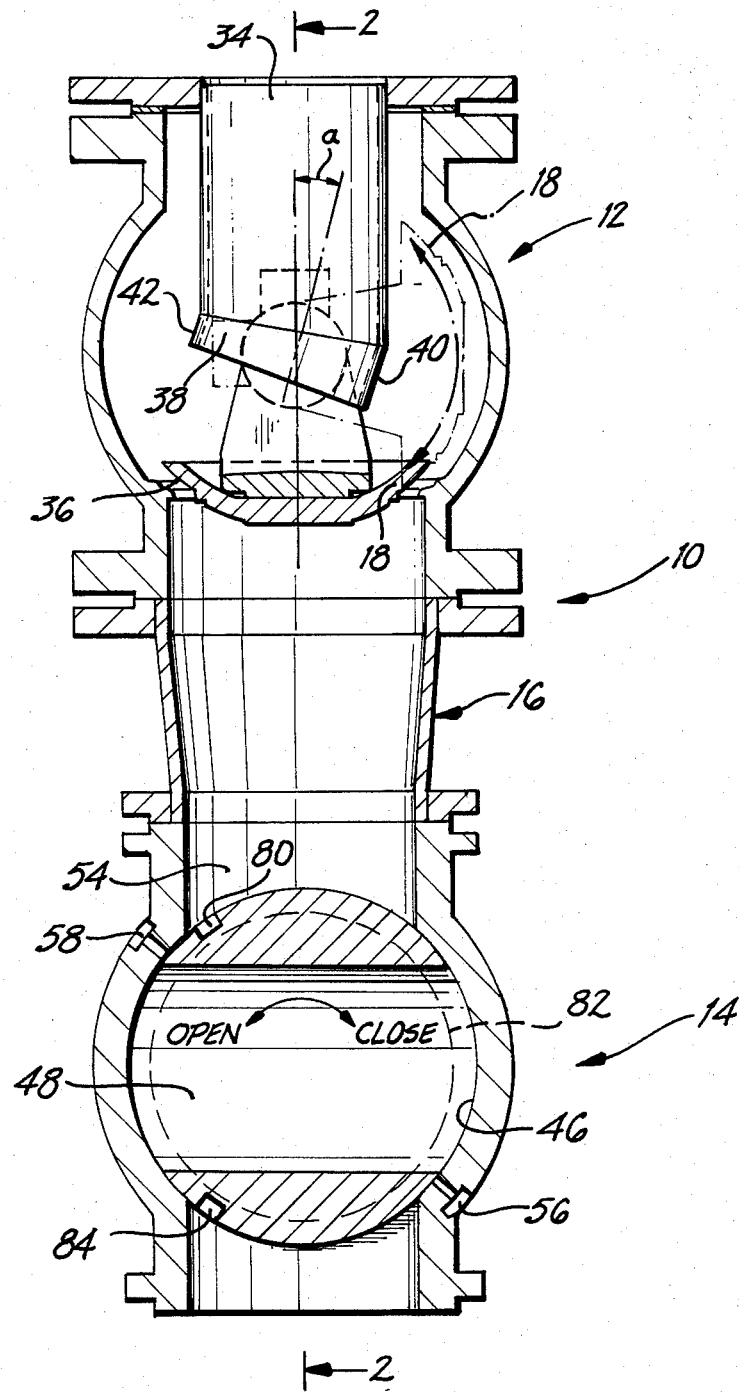
FIG. 1 is a vertical section through a double valve assembly incorporating a preferred embodiment of the invention with the feed tube shown in elevation.

Particulate iron ore is introduced into the upper section of the valve assembly through a feed pipe 34 which extends to a point below the axis 20 and preferably to a point only a short distance above the upper surface of valve member 18 so that when the valve member is in its first or closed position only a relatively small amount of the particulate ore collects in the space between the bottom of the feed tube and the upper surface of the valve member 18. When the valve member 18 is in its closed position as shown in solid lines in FIG. 1, it cooperates with a valve seat 36 formed in the lower part of the upper section 12 of the casing. It is not necessary that the valve member 18 engage the seat 36 tightly since the valve member 18 performs only a flow-controlling function and the sealing function is performed by the structure in the lower section 14 of the valve assembly described below. As indicated in FIG. 1, the valve member 18 is swingable from a first position shown in solid lines wherein it confronts the lower end of feed tube 34 to a second or open position shown in dotted lines wherein it is positioned at one side of the feed tube.

As indicated above, when using the straight-sided feed tube heretofore employed in double valve structures of this type, particulate ore tends to accumulate on the valve member 18 when it is in its closed position to such an extent as to impede swinging of the valve member to its open position at one side of the feed tube. In accordance with the present invention and as illustrated in FIGS. 1 and 2, the discharge end of the feed tube 34 is constructed and arranged to direct particulate ore away from the second position of valve member 18. More particularly, at the bottom of feed tube 34 there is a baffle ring 38 that has generally the same cross-section as the main portion of the feed tube but is laterally canted away from the second position of valve member 18. As particularly shown in FIG. 1, the portion 40 of baffle ring 38 nearest the second position of valve member 18 has a greater length in the direction of flow of solids through the feed tube than the portion 42 of ring 38 that is remote from the second position of valve member 18. With this construction the ore particles flowing through tube 34 are guided toward the left side of valve member 18 as viewed in FIG. 1 and movement of the valve member to its open (dotted line) position is thereby facilitated. It has been found that the angle "α" between the central axis of the main portion of feed tube 34 and the central axis of baffle ring 38 should desirably be between 10° and 30°.

In the lower section 14 of the valve assembly casing there is a cylindrical valve plug 44 and cooperating valve seat 46. The valve plug 44 and its cooperating seat 46 are of a generally conventional construction and the valve plug has a cylindrical port 48 extending therethrough. It is made rotatable within the cylindrical seat 46 by means of a journal member 50 as illustrated in FIG. 2 and which extends through the wall of the lower section 14 of the casing and has secured to its outer end a lever 52 by means of which the valve plug can be rotated to bring the port 48 into registry with a passage 54 that extends vertically within the lower section 14 of the casing. Extending through the wall of the lower section 14 of the casing there are lubricating passages 56 and 58 through which lubricant is supplied to the cylindrical surface of plug 44 and thereby ensure a tight seal between the valve plug and its seat 46 to prevent flow of pressure fluid through the passage 54 when the valve plug is so positioned that port 48 is out of registry with passage 54. The lubricant which is supplied to the valve everytime it is opened or closed prevents accumulation of fine powder granules between the valve seat 46 and plug 44 which could cause friction and abrasion which could result in leaks and pressure loss. A spring 60 located in a recess 62 of a cap 64 threaded into the side wall of lower section 14 of the casing is biased to urge the valve plug toward and against the opposite wall of the casing.

It has been found that it is advantageous to supply both sealing and lubricating grease to the surface of valve plug 44. The grease can be supplied through lubricating passages 56 and 58 as described above or through the lubricating passages and grooves in the valve element shown in FIG. 3. The sealing grease is supplied when desired to provide a tight gas seal.

Figure 3:
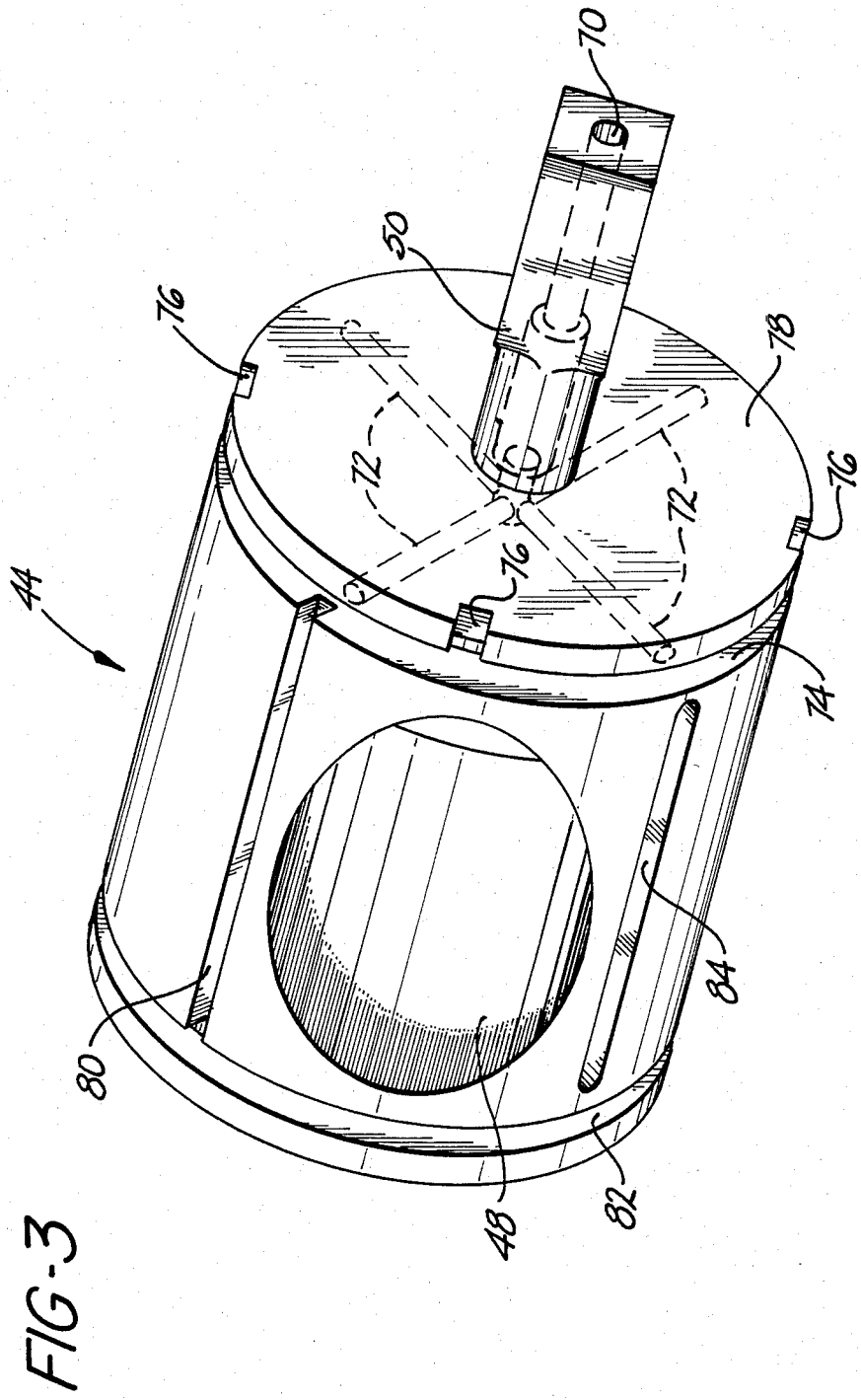
FIG. 3 is a perspective view of the valve element of the sealing valve showing the conduits for distributing a sealing or lubricating grease along the surfaces thereof.

FIG. 3 illustrates the valve element of the sealing valve effective for providing a seal against leakage of gas under pressure from the reactor. The valve plug is provided with a number of lubricant distributing passages and grooves as shown. Lubricant is supplied under pressure through a lubricant supply passage 70 in the journal member 50 into a series of four radial passages 72 through which it flows outwardly to circumferential groove 74. From groove 74 lubricant flows through slots 76 providing lubrication to the adjacent end surface 78 of the valve. Lubricant also flows from groove 74 through a pair of longitudinal slots 80, of which only one is shown, to a second circumferential groove 82 positioned at the opposite end of the valve. A pair of closed end grooves 84, of which only one is shown, are formed in the valve face and circumferentially spaced from longitudinal slots 80 and the port 48.

Grooves 84 collect lubricant as the valve is rotated and serve to further promote lubrication of the valve surface. The slots 80 and grooves 84 are desirably positioned circumferentially at 90° intervals.

The valve assembly is so constructed as to prevent undesired contact between the particulate ore and the sealing surfaces of the valve plug 44. When it is desired to cause the particulate ore to flow through the valve assembly, the valve plug 44 is rotated to bring port 48 into registry with passage 54 and thereafter valve member 18 is swung to the position shown in dotted lines in FIG. 1. The cross-sectional area of the interior of feed tube 34 is desirably no greater than and preferably somewhat less than the cross-sectional area of port 48. Also the cross-sectional area of passage 54 is desirably no greater than and preferably somewhat less than the cross-sectional area of port 48. Thus, as particulate material flows through the valve assembly, it does not come in contact with the sealing surface of the valve plug. Also, by making the cross-sectional area of feed tube 34 less than that of port 48, abrasion of the internal surface of port 48 is minimized as the particulate material flows therethrough.

As pointed out above, in order to minimize possible erosive contact between the particulate material and the sealing surfaces of the valve plug, when the valves are opened to permit flow of material through the valve assembly the plug valve should be opened first and the swingable valve second. Also, when the valves are closed to stop flow through the valve assembly, the swingable valve should be closed first and the plug valve thereafter. It has been found that if the valves are operated in this order and the surface of the valve plug is properly lubricated, as for example by the lubricating passages 56 and 58, an effective gas-tight seal can be maintained for a long period of time.

From the foregoing description it should be apparent that the present invention provides a valve assembly capable of yielding the advantages outlined at the beginning of the present specification. It is, of course, to be understood that the foregoing description is intended to be illustrative, and that numerous modifications can be made within the scope of the invention. For example, although the valve have been described as manually operated, it is apparent that the valve-operating levers 30 and 52 can be actuated by an automatic control mechanism to achieve the desired sequence of valve operations. Other modifications within the scope of the invention will be apparent to those skilled in the art.

What is claimed is:

1. A valve assembly adapted to be used in regulating the flow of a particulate material to or from a pressure vessel, said valve assembly comprising a substantially vertically disposed casing, a dish-shaped valve member pivotally mounted in the upper side walls of said casing for swinging movement about a substantially horizontal axis, a feed tube located at the top of said casing for conducting particulate material into said casing above said valve member, said valve member being selectively swingable between a first position in which its upper surface closely confronts the lower end of said feed tube and a second position at one side of said feed tube, and a plug valve including a valve plug and seat substantially horizontally arranged in the lower part of said casing, said plug valve seat having a passage therethrough and said valve plug having a port adapted to register with said passage, said valve plug being selectively rotatable to bring said port into or out of registry with said passage, said lower end of said feed tube including guide means to guide particulate material flowing out said lower end of said feed tube away from said one side thereof to facilitate movement of said dish-shaped valve member from said first position to said second position, said guide means including a member laterally canted in a direction away from said one side of the feed tube.

2. A valve assembly according to claim 1 wherein said guide means includes a baffle ring having substantially the same cross-section as the main portion of said feed tube, but canted laterally away from said one side thereof.

3. A valve assembly according to claim 2 wherein the portion of said baffle ring nearest said second position of said valve member has a greater length in the direction of flow of material through said feed tube than the portion of said baffle ring most remote from said second position.

4. A valve assembly according to claim 2 wherein the angle between the central axis of the main portion of the feed tube and the central axis of said baffle ring is between 10° and 30°.

5. A valve assembly according to claim 1 wherein said lower part of the casing forming the seat for said plug valve has at least one lubricant passage extending through the casing lower part to said valve plug and communicating with the outer surface of said valve plug for supplying lubricant to said outer surface of said valve plug.

6. A valve assembly according to claim 5, wherein said valve plug is rotatable substantially 90° between its in-registry and out-of-registry conditions, and said at least one lubricant passage includes an upper passage above the out-of-registry position of the valve plug passage on the down-turning side of the valve seat, considered when the valve plug is brought into its in-registry condition, and a lower passage below the out-of-registry position of the valve plug passage on the up-turning side of the valve seat, considered when the valve plug is brought to its in-registry condition.

* * * * *